(12) United States Patent
Sangar

(10) Patent No.: US 10,361,012 B2
(45) Date of Patent: Jul. 23, 2019

(54) DOWNHOLE CABLE WITH INTEGRATED NON-METALLIC TUBE

(71) Applicant: NEXANS, Paris (FR)

(72) Inventor: Robin K. Sangar, Drobak (NO)

(73) Assignee: NEXANS, Courbevoie (FR)

( * ) Notice: Subject to any disclaimer, the term of this patent is extended or adjusted under 35 U.S.C. 154(b) by 135 days.

(21) Appl. No.: 14/985,878

(22) Filed: Dec. 31, 2015

(65) Prior Publication Data

US 2016/0211054 A1  Jul. 21, 2016

(30) Foreign Application Priority Data

Jan. 16, 2015 (EP) ..................................... 15305040

(51) Int. Cl.
*H01B 7/28* (2006.01)
*F16L 11/08* (2006.01)
*F16L 11/22* (2006.01)
*H01B 7/04* (2006.01)

(52) U.S. Cl.
CPC .......... *H01B 7/2806* (2013.01); *F16L 11/082* (2013.01); *F16L 11/083* (2013.01); *F16L 11/22* (2013.01); *H01B 7/045* (2013.01)

(58) Field of Classification Search
CPC ................................................... H01B 7/2806
USPC ..................................................... 174/106 R
See application file for complete search history.

(56) References Cited

U.S. PATENT DOCUMENTS

| | | | |
|---|---|---|---|
| 2,894,057 A | 7/1959 | Arthur | |
| 3,212,528 A * | 10/1965 | Haas | ..................... B29D 23/001 138/129 |
| 3,506,040 A * | 4/1970 | Everling | ................ F16L 11/083 138/130 |
| 2005/0067034 A1 | 3/2005 | Thomson | |
| 2006/0016502 A1* | 1/2006 | Lund | ......................... F16L 9/19 138/140 |
| 2006/0151194 A1* | 7/2006 | Varkey | .................... H01B 7/046 174/102 R |
| 2009/0151805 A1 | 6/2009 | Martino et al. | |
| 2010/0089478 A1* | 4/2010 | Gudme | ................. F16L 11/083 138/104 |
| 2013/0168093 A1* | 7/2013 | Qu | ...................... E21B 43/2401 166/303 |

(Continued)

FOREIGN PATENT DOCUMENTS

| | | |
|---|---|---|
| GB | 2057779 | 4/1981 |
| GB | 2245678 | 1/1992 |
| GB | 2466262 | 6/2010 |

OTHER PUBLICATIONS

Search Report dated 2015.

*Primary Examiner* — Stanley Tso
(74) *Attorney, Agent, or Firm* — Sofer & Haroun, LLP

(57) ABSTRACT

A non-corrugated cable 10 with a hollow core 20, suited for subsea operations at big sea depths and corrosive environments has a core 20 with a tube shaped non-metallic material for withstanding corrosion. A first inner armoring layer 30 is wounded onto the core 20, and at least a second armoring layer 40 is wounded onto the first inner armoring layer 30. Each armoring layer is laid counter-helically on each other for providing radial reinforcement of the core 20. The first inner armoring layer 30 has a smaller diameter of its wires than the second armoring layer 40. An outer protective non-corrosive sheath 50 is covering said armoring layers.

10 Claims, 1 Drawing Sheet

(56) References Cited

U.S. PATENT DOCUMENTS

| | | | |
|---|---|---|---|
| 2014/0103203 A1* | 4/2014 | Tjhang | G01V 8/10 250/269.1 |
| 2014/0299348 A1* | 10/2014 | Daumand | H05K 9/0098 174/107 |
| 2016/0111184 A1* | 4/2016 | Gogola | H01B 7/14 174/130 |

* cited by examiner

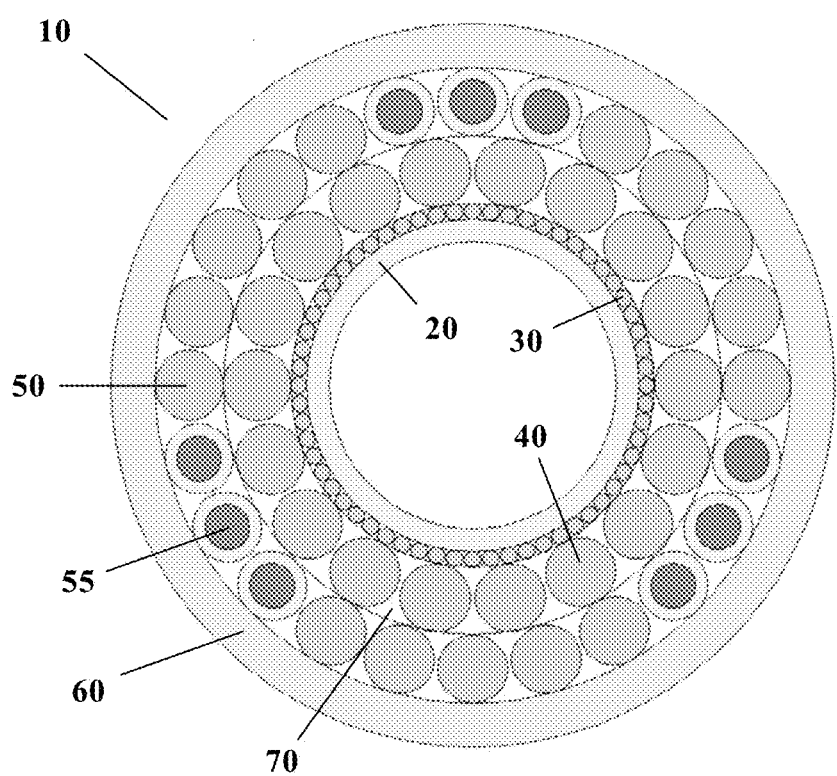

DOWNHOLE CABLE WITH INTEGRATED NON-METALLIC TUBE

RELATED APPLICATION

This application claims the benefit of priority from European Patent Application No. 15 305 040.6, filed on Jan. 16, 2015, the entirety of which is incorporated by reference.

BACKGROUND

Field of the Invention

The present invention relates a cable with a hollow conduit, and more specifically to a slim constructed subsea cable with an integrated non-metallic tube for withstanding corrosion as well as high pressure.

Description of Related Art

Many types of cables have been used over the years for communicating with and controlling of different types of equipment located subsea and downhole. It may be cables connected to logging tools and other equipment located in a subsea environment. Such cables may be permanently deployed.

Permanently deployed subsea cables may be exposed to corrosion due to harsh environment. For such use, the cables are typically enclosed in an outer sheath made of a non-corrosive material.

Some subsea cables comprise a hollow conduit disposed in the cable. Due to exposure of high pressure when used at great sea depths, the hollow conduit is typically a metallic tube or a reinforced non-metallic tube such as an armoured hose. The tube may serve as a conveyor for various liquids such as for instance oil, hydraulic fluid and coolant.

Using a metallic tube or a reinforced non-metallic tube in a downhole cable does however introduce drawbacks for specific applications. A metallic tube is heavy and stiff and a reinforced non-metallic tube is necessarily thick. Further, the cost of both metallic tubes and non-metallic armoured hoses that have an acceptable lifetime and that can handle high pressure and temperature renders solutions that are costly for implementation. They are thus not always well suited for certain applications where cost, weight and size are an issue.

GB 2057779 A discloses a corrugated tubular casing for electric cable. The tubular casing is reinforced by a first layer of helical armoring followed by at least a second layer of counter helical armoring. The first armoring layer is adjusted to fit into the corrugations of the tube. Use of corrugated tubular casing for holding electrical wires is well known in the field of electrical installation. A corrugated tube is however not suitable for effective transportation of fluids due to the corrugations on the inside of the tube. The way the first armouring layer is wounded and placed in the groves on the outside of the tube will further not provide a continuous distribution of radial forces and optimal protection against radial forces if used at great water depth. The construction is thus not suited for transporting fluids in environments where it is exposed to high pressure.

The present invention proposes a cable construction with a hollow conduit made of an inexpensive non-metallic tube that can handle high temperatures and harsh chemical environments. Since the tube can not withstand very high pressures on its own it is therefore reinforced with armouring. This is arranged such that optimal protection against radial forces is achieved while keeping the diameter of the cable at a minimum. The resulting weight reduction of the cable will provide a cable that is well suited for subsea and downhole operations.

The invention provides a cost effective and robust cable with an integrated tube. The cable is well suited for transporting fluids in subsea applications in corrosive environments at great sea depths.

OBJECTS AND SUMMARY

The present invention comprises a cable with a hollow core and which is suited for transporting fluids for subsea operations at big sea depths and in corrosive environments. The cable comprises a core made of a tube shaped non-metallic material; a first inner armouring layer wounded helically onto the core, and at least a second armouring layer wounded onto the first inner armouring layer, where each armouring layer is laid counter-helically on each other for providing radial reinforcement of the core, and where each armouring layer has different diameters. An outer protective non-corrosive sheath is covering said armouring layers.

Further features of the cable are defined in the claims.

The invention also comprises the use of a cable construction according to the invention where the cable is used for transporting fluids in corrosive environments at great water depth to subsea equipment and installations.

BRIEF DESCRIPTION OF THE DRAWINGS

FIG. 1 illustrates a cable according to one embodiment.

DETAILED DESCRIPTION

The invention will now be described in detail with reference to FIG. 1 which shows the constructive details of the cable according to the invention.

The following description is not intended to be construed in a limiting sense. Various modifications and variations of the illustrative embodiment, as well as other embodiments of the cable, which are apparent to a person skilled in the art and to which the disclosed subject matter pertains, are deemed to lie within the scope of the present invention as defined in the claims.

FIG. 1 illustrating one embodiment of the cable 10 shows the constructive details of the cable 10 according to the invention. The cable 10 is especially well suited for applications and operations at big sea depths and corrosive environments. It is designed to withstand high pressure and corrosion over time and is thus also well suited being used for applications in less demanding environments.

The cable 10 comprises a hollow core 20 for conveying various liquids. In one embodiment the core 20 is a non-corrugated tube. The core 20 comprises a tube shaped non-metallic material for withstanding corrosion. The core 20 is preferably disposed in a configuration making the centre of the cable. It may however also be enclosed in other configurations comprising a bundled cable arrangement as described below.

The core 20 is preferably a polymer tube. In one embodiment the polymer tube is made of fluorinated ethylene propylene (FEP). Other options for the tube material are feasible, for instance ethylene tetrafluoroethylene (ETFE), poly tetra-fluoroethylene (PTFE), Perfluoroethers (PFA) or other fluorpolymers. A tube made of one of these materials is a relatively cheap and available type of tube or hose. The polymer tube may further be made of a reinforced material.

A core 20 that is made of a non-metallic material will be able to withstand high temperatures and corrosive environments. It will not however withstand high radial pressures that it is exposed to when used at great sea depths. In order to improve resistance to radial forces, the core 20 is enclosed by armouring layers.

A first inner armouring layer 30 is helically wounded onto the core 20. This first armouring 30 layer is preferably made of a plurality of stranded wires with as small diameter as possible, e.g. 0.7 mm. A diameter of the stranded wires in the range of 0.5-0.8 mm for a tube having an outer diameter of approximately 15 mm is suitable. In this way radial forces will work on the inside of the tube since there will be as many points as possible to distribute radial force into. The tube will thus not rupture until wires first give away.

The first inner armouring layer 30 is enclosed by at least a second armouring layer 40 which is wounded onto the first inner armouring layer 30. The second armouring layer 40 is made with stranded wires having a different diameter than the stranded wires of the first armouring layer 30. The diameter of the stranded wires of the second armouring layer 40 is preferably larger than the diameter of the stranded wires of the first armouring layer 30, e.g. 3.0 mm. A diameter of the stranded wires of the second armouring layer in the range of 1.0-3.5 mm is suitable. This diameter is however not as critical as the diameter of the stranded wires of the first armouring layer. The second armouring layer 40 is wounded counter-helically onto the first armouring layer 30. This configuration will increase the resistance against radial forces exerted on the core 20 and lock the inner armouring layer 30 in place.

The interstices between each layer are filled with a pressure compensated filling compound 70. The function of the filling compound is basically that is retains some fluidity, so that even if the cable is under pressure or is depressurized, it does not lead to cracks or weakening, which could happen to a solid filling material. A gel or bitumen like compound is commonly used for subsea cables.

The core 20 and armouring layers are enclosed by an outer protective non-corrosive sheath 60. This is preferably made of ethylene tetrafluoroethylene (ETFE).

Said construction with a non-metallic core 20 made of a tube that is reinforced by first and second armouring layers 30, 40 provides a cost effective downhole cable 10 for conveying fluids, and which is well suited for operating in harsh environments with high pressures.

In one embodiment of the invention, the cable 10 further comprises a third armouring layer 50 which preferably is wounded counter helically onto the second armouring layer 40. This layer may comprise insulated conductors 55 mixed with stranded wires, e.g. copper conductors. The conductors 55 can be used for transferring power and/or signals to downhole equipment. By having insulated conductors 55 in the same layer as an armouring layer allows for a slimmer outer diameter of the cable 10.

Further armouring layers may be added according to needs and a pressure compensated filling compound 70 is preferably applied between each layer.

In one embodiment of the invention the cable 10 comprising a hollow core 20 enclosed by armouring layers is bundled in a cable arrangement with one or more additional cables. The additional cables may be one or more of the type of cable 10 according to the present invention, or one or more of different types of cables.

The cable 10 according to the invention can be made by first providing a core 20 which is a tube shaped non-metallic material for withstanding corrosion. The core 20 is preferably a polymer tube, e.g. a tube made of thermoplastic such as fluorinated ethylene propylene.

The next step is to wind a first inner armouring layer 30 onto said core 20, and then to wind at least a second armouring layer 40 onto the first inner armouring layer 30. Each armouring layer is laid counter-helically on each other for providing radial reinforcement of the core 20 and locking each layer.

The last step is to cover said armouring layers with an outer protective non-corrosive sheath 60, e.g. made of ethylene tetrafluoroethylene.

In one embodiment one or more additional steps may be performed before said last step of applying the outer sheath 60. This is to wind a third armouring layer 50 counter-helically onto the second armouring layer 40, and where said third armouring layer 50 comprises integrated insulated conductors 55. Additional steps may be added for applying more layers before applying the outer sheath 60 of the cable 10.

Before adding layers, the interstices between each layer are preferably filled with a pressure compensated filling compound 70.

The present invention is also defined by using of a cable construction according to the invention where the cable is used for transporting fluids in corrosive environments at great water depth to subsea equipment and installations.

The proposed cable 10 and the use of this according to the present invention provides a cost efficient cable 10 with a core 20 made of a non-metallic tube capable of handling high temperatures, harsh chemical environments and high pressures. The construction provides optimal protection against radial forces while the diameter of the cable 10 is kept at a minimum. The resulting weight reduction of the cable 10 will provide a cost effective cable 10 for transporting fluids and which is well suited for permanent deployed in subsea and downhole operations and in corrosive environments and at great sea depths.

The invention claimed is:

1. A cable with a hollow core for transporting fluids for subsea operations and in corrosive environments, characterised in comprising:
   a core made of a tube shaped non-metallic material;
   a first inner armouring layer wounded helically onto the core directly in contact with said core,
   and at least a second armouring layer wounded onto the first inner armouring layer directly in contact with said core,
   where each armouring layer is laid counter-helically on each other for providing radial reinforcement of the core,
   and wherein wires of each armouring layer has different diameters;
   an outer protective non-corrosive sheath covering said armouring layers,
   wherein the diameter of the stranded wires of the second armouring layer is larger than the diameter of the stranded wires of the first armouring layer,
   and wherein the diameter of the wires of the first inner armouring layer is between 0.5 mm-0.8 mm and the diameter of the wires of the second armouring is between 1.0 mm-3.5 mm;
   wherein a third armouring layer is provided wound counter helically onto the second armouring layer,
   said third armouring layer having integrated insulated conductors mixed with stranded wires,
   the integrated insulated conductors and elements of said third armouring layer being of the same outer diameter, said integrated insulated conductors sufficient for transferring power and/or signals to downhole equipment.

2. A cable according to claim 1, wherein the core is a non-corrugated tube.

3. A cable according to claim 1, where the core is a polymer tube.

4. A cable according to claim 3, where the polymer tube is made of fluorinated ethylene propylene, FEP.

5. A cable according to claim 3, where the polymer tube is made of a reinforced material.

6. A cable according to claim 1, wherein the armouring layers comprise stranded wires.

7. A cable according to claim 1, wherein interstices between each armouring layer are filled with a pressure compensated filling compound.

8. A cable according to claim 1, wherein the outer sheath is made of ethylene tetrafluoro-ethylene (ETFE).

9. A cable according to claim 1, wherein the cable is comprised in a bundled cable arrangement with one or more additional cables.

10. Method of transporting fluids in corrosive environments to subsea equipment and installations, said method comprising the steps of:

transporting fluids to subsea equipment and installations in cable according to claim 1.

* * * * *